(12) United States Patent
Tyink

(10) Patent No.: US 10,863,679 B2
(45) Date of Patent: Dec. 15, 2020

(54) MODULAR PLANT GROWTH APPARATUS

(71) Applicant: Fork Farms Holdings, LLC, Appleton, WI (US)

(72) Inventor: Alexander R. Tyink, Appleton, WI (US)

(73) Assignee: Fork Farms Holdings, LLC, Appleton, WI (US)

(*) Notice: Subject to any disclaimer, the term of this patent is extended or adjusted under 35 U.S.C. 154(b) by 377 days.

(21) Appl. No.: 15/259,340

(22) Filed: Sep. 8, 2016

(65) Prior Publication Data

US 2018/0064037 A1    Mar. 8, 2018

(51) Int. Cl.
| | | |
|---|---|---|
| *A01G 9/02* | (2018.01) | |
| *A01G 31/06* | (2006.01) | |
| *A01G 7/04* | (2006.01) | |
| *A01G 27/00* | (2006.01) | |
| *A01G 31/02* | (2006.01) | |

(52) U.S. Cl.
CPC ............ *A01G 9/027* (2013.01); *A01G 7/045* (2013.01); *A01G 9/023* (2013.01); *A01G 27/008* (2013.01); *A01G 31/02* (2013.01); *A01G 31/06* (2013.01)

(58) Field of Classification Search
CPC ........ A01G 9/027; A01G 9/022; A01G 7/045; A01G 27/005; A01G 31/02
USPC ................................................. 47/66.3–66.5
See application file for complete search history.

(56) References Cited

U.S. PATENT DOCUMENTS

| | | | | |
|---|---|---|---|---|
| 922,888 A | * | 5/1909 | Grunwaldt ............. | A01G 31/02 211/131.1 |
| 4,065,876 A | * | 1/1978 | Moffett, Jr. ............ | A01G 9/022 47/83 |
| 4,218,847 A | * | 8/1980 | Leroux ................... | A01G 31/06 47/59 R |
| 4,231,189 A | * | 11/1980 | Hochberg .............. | A01G 9/022 220/4.24 |
| 4,250,666 A | * | 2/1981 | Rakestraw ............. | A01G 7/045 211/131.1 |
| 4,594,811 A | * | 6/1986 | Tokoro ................... | A01G 31/06 47/65 |
| 4,756,120 A | * | 7/1988 | Arledge ................. | A01G 31/06 47/59 R |

(Continued)

FOREIGN PATENT DOCUMENTS

| | | | | |
|---|---|---|---|---|
| CA | 2947608 | A1 * | 11/2015 | ............. A01G 31/02 |
| CN | 203907419 | U | 10/2014 | |

(Continued)

*Primary Examiner* — Magdalena Topolski
*Assistant Examiner* — Morgan T Barlow
(74) *Attorney, Agent, or Firm* — Padda Law Group

(57) ABSTRACT

A modular plant growth apparatus for large-scale commercial and residential uses having a housing with a top portion which is a flat panel, a bottom portion and two sides, each side having several hinges which can hingedly connect to a corresponding side of another flat panel, the top portion having a front side with removable plant wells, the bottom portion being angled to act as a stability support portion. The apparatus also including a light source and at least one plant in each plant well. Several housings can be hingedly connected to corresponding other housings so various modular configurations can be formed so as to maximize plant growth.

16 Claims, 15 Drawing Sheets

(56) References Cited

U.S. PATENT DOCUMENTS

| | | | | |
|---|---|---|---|---|
| 4,920,695 A * | 5/1990 | Garden | A01G 9/022 | 47/67 |
| 5,130,091 A * | 7/1992 | Saceman | A01G 9/00 | 422/4 |
| 5,159,779 A * | 11/1992 | Johnson | A01C 1/02 | 47/58.1 R |
| 5,224,291 A * | 7/1993 | Sherfield | A01G 31/02 | 47/62 R |
| 5,265,376 A * | 11/1993 | Less | A01G 9/022 | 47/83 |
| 5,363,594 A * | 11/1994 | Davis | A01G 9/022 | 47/82 |
| 5,555,676 A * | 9/1996 | Lund | A01G 9/022 | 47/82 |
| 6,178,692 B1 * | 1/2001 | Graven | A01G 9/022 | 47/82 |
| 6,408,570 B1 * | 6/2002 | Shih | A01G 31/02 | 47/79 |
| 6,604,321 B2 * | 8/2003 | Marchildon | A01G 31/047 | 47/62 R |
| 6,615,542 B2 * | 9/2003 | Ware | A01G 31/02 | 47/83 |
| 6,904,715 B1 * | 6/2005 | Lawton | A01G 9/026 | 47/65.7 |
| 7,143,544 B2 * | 12/2006 | Roy | A01G 31/02 | 47/60 |
| 7,536,829 B2 * | 5/2009 | Genma | A01G 9/02 | 47/67 |
| 7,770,323 B2 * | 8/2010 | Kim | A01G 9/02 | 47/66.3 |
| D638,743 S * | 5/2011 | Bouchard | D11/143 | |
| 8,365,466 B1 * | 2/2013 | Storey | A01G 31/06 | 47/62 C |
| 8,516,743 B1 * | 8/2013 | Giacomantonio | A01G 31/02 | 47/62 A |
| 8,578,651 B1 * | 11/2013 | Giacomantonio | A01G 31/02 | 47/59 R |
| D719,055 S * | 12/2014 | Tyink | D11/143 | |
| 9,374,952 B1 * | 6/2016 | Cross | A01G 31/02 | |
| 9,974,243 B2 * | 5/2018 | Martin | A01G 31/047 | |
| 2003/0089037 A1 * | 5/2003 | Ware | A01G 31/02 | 47/83 |
| 2003/0224507 A1 * | 12/2003 | Darlington | B01D 53/85 | 435/300.1 |
| 2005/0039397 A1 * | 2/2005 | Roy | A01G 31/02 | 47/62 R |
| 2005/0055879 A1 * | 3/2005 | Darlington | A01G 31/02 | 47/62 R |
| 2006/0156624 A1 * | 7/2006 | Roy | A01G 31/02 | 47/62 R |
| 2007/0033866 A1 * | 2/2007 | Henry | A01G 9/022 | 47/40.5 |
| 2008/0120904 A1 * | 5/2008 | Takahashi | A01G 9/022 | 47/65.8 |
| 2012/0281413 A1 * | 11/2012 | Lewis | A01G 7/045 | 362/249.11 |
| 2012/0291349 A1 * | 11/2012 | Teng | A01G 9/022 | 47/65.7 |
| 2012/0297679 A1 * | 11/2012 | Busch | A01G 9/022 | 47/62 R |
| 2012/0311929 A1 * | 12/2012 | Daas | A01G 31/02 | 47/65.8 |
| 2013/0118074 A1 * | 5/2013 | Fulbrook | A01G 9/025 | 47/62 N |
| 2013/0160363 A1 * | 6/2013 | Whitney | A01G 31/02 | 47/59 S |
| 2013/0212940 A1 * | 8/2013 | Blyden | A01G 9/022 | 47/65.8 |
| 2013/0213841 A1 * | 8/2013 | Ward | A01G 9/081 | 206/386 |
| 2014/0000163 A1 * | 1/2014 | Lin | A01G 31/02 | 47/62 R |
| 2014/0283450 A1 * | 9/2014 | Darlington | A01G 31/02 | 47/62 A |
| 2015/0040477 A1 * | 2/2015 | Wang | A01G 31/02 | 47/62 N |
| 2015/0077984 A1 * | 3/2015 | Smith | A01G 7/045 | 362/231 |
| 2015/0116997 A1 * | 4/2015 | Tappert | A01K 63/06 | 362/231 |
| 2015/0223402 A1 * | 8/2015 | Krijn | A01G 7/045 | 47/58.1 LS |
| 2015/0237811 A1 * | 8/2015 | Marquez | A01G 9/023 | 47/66.6 |
| 2015/0264859 A1 * | 9/2015 | Morrissey | A01G 9/02 | 700/282 |
| 2015/0289452 A1 * | 10/2015 | Axley | F28C 3/06 | 47/66.6 |
| 2015/0305108 A1 * | 10/2015 | Probasco | A01G 22/00 | 47/58.1 LS |
| 2015/0334930 A1 * | 11/2015 | Stoltzfus | A01G 31/06 | 47/62 A |
| 2016/0029581 A1 * | 2/2016 | Martin | A01G 31/06 | 47/62 A |
| 2016/0157447 A1 * | 6/2016 | Hanzawa | A01G 9/246 | 47/60 |
| 2016/0366838 A1 * | 12/2016 | Hanzawa | A01G 31/06 | |
| 2017/0055460 A1 * | 3/2017 | Brusatore | A01G 31/06 | |
| 2017/0055538 A1 * | 3/2017 | Ohta | A23L 3/266 | |
| 2017/0094920 A1 * | 4/2017 | Ellins | A01G 31/02 | |
| 2017/0099792 A1 * | 4/2017 | Gallant | A01G 7/02 | |
| 2017/0105372 A1 * | 4/2017 | Bryan, III | A01G 31/02 | |
| 2017/0142912 A1 * | 5/2017 | Gasmer | A01G 9/0297 | |
| 2017/0258021 A1 * | 9/2017 | Chiu | A01G 31/02 | |
| 2017/0265408 A1 * | 9/2017 | McGowan | A01G 22/00 | |
| 2017/0299148 A1 * | 10/2017 | Xie | F21V 29/00 | |
| 2017/0339841 A1 * | 11/2017 | Monasterio | A01G 9/0293 | |
| 2017/0339842 A1 * | 11/2017 | Weisel | A01G 9/025 | |
| 2017/0339854 A1 * | 11/2017 | van der Merwe | A01G 9/1438 | |
| 2018/0000029 A1 * | 1/2018 | Martin | A01G 31/06 | |
| 2018/0007838 A1 * | 1/2018 | McCord | A01G 7/045 | |
| 2018/0007845 A1 * | 1/2018 | Martin | A01G 31/047 | |
| 2018/0014486 A1 * | 1/2018 | Creechley | A01G 2/20 | |
| 2018/0035619 A1 * | 2/2018 | Ueno | H05B 33/0845 | |
| 2018/0084738 A1 * | 3/2018 | Kuo | A01G 22/00 | |
| 2018/0110188 A1 * | 4/2018 | Zhou | A01G 9/023 | |
| 2018/0168108 A1 * | 6/2018 | Foreman | A01G 22/00 | |
| 2018/0199526 A1 * | 7/2018 | Guo | A01G 9/047 | |
| 2018/0206414 A1 * | 7/2018 | Goodman | A01G 9/022 | |
| 2018/0235155 A1 * | 8/2018 | Funamori | A01G 7/00 | |
| 2018/0255709 A1 * | 9/2018 | Topps | A01G 7/045 | |
| 2018/0263201 A1 * | 9/2018 | Linneberg | A01G 31/02 | |

FOREIGN PATENT DOCUMENTS

| | | | | |
|---|---|---|---|---|
| CN | 204837399 U | | 12/2015 | |
| CN | 205143093 U | | 4/2016 | |
| DE | 202012011315 U1 | * | 2/2013 | A01G 9/027 |
| DE | 202012011393 U1 | * | 3/2013 | A01G 7/045 |
| EP | 1779720 A1 | * | 5/2007 | A01G 9/02 |
| EP | 3251499 A1 | * | 12/2017 | A01G 31/02 |
| FR | 2968891 A1 | * | 6/2012 | A01G 9/025 |
| FR | 3061259 A1 | * | 6/2018 | A01G 9/027 |
| JP | 2012228231 A | * | 11/2012 | A01G 7/045 |
| JP | 5492758 B2 | * | 5/2014 | A01G 7/045 |
| JP | 5495198 B1 | * | 5/2014 | A01G 9/024 |
| JP | 5535390 B1 | | 7/2014 | |
| JP | 2015000002 A | * | 1/2015 | A01G 9/024 |
| WO | WO-2006003645 A2 | * | 1/2006 | A01G 9/022 |
| WO | WO-2015108053 A1 | * | 7/2015 | A01G 9/025 |
| WO | WO-2016053781 A1 | * | 4/2016 | A01G 9/025 |
| WO | WO-2016072042 A1 | * | 5/2016 | A01G 31/04 |
| WO | WO-2016081711 A2 | * | 5/2016 | A01G 9/025 |
| WO | WO-2017118814 A1 | * | 7/2017 | A01G 9/025 |
| WO | WO-2018035314 A1 | * | 2/2018 | A01G 27/00 |

* cited by examiner

MODULAR PLANT GROWTH APPARATUS

FIELD

The present invention relates to plant growing apparatuses and specifically to modular plant growing apparatuses that use a light source.

BACKGROUND

Over the past decade we have seen a surge in the development of farming units, businesses and organizations across the United States. Farming in controlled environments removes many links from the supply chain, which reduces costs and barriers when compared to conventional agriculture and offers fresher product to consumers.

Successful implementation of these enterprises is dependent on cost effective grow practices and resource utilization. Current industry standards utilize methods that take advantage of the year round and consistent production of controlled environments, both highly marketable qualities, but have yet to discover significant novel ways to reduce the electrical costs and space utilization of their grow systems while increasing growth rates. In addition, there has yet to be a strong scalable plant growth apparatus for home, institutional (such as in schools or hospitals) and commercial production that adequately improves upon current methods and operating costs.

A wide variety of growth apparatuses have been created and are available. However, there is a need for improvement in plant growth apparatuses, and it is to this need that this device and related method is directed.

SUMMARY

In accordance with the present device and related method, a modular plant growth apparatus is provided for optimum growth of plants around a light source. The plant growth apparatus of this invention overcomes certain problems and shortcomings present in the prior art and provides a unique structure which satisfies plant growth needs.

Applicant's research related to the apparatus and method using the same, applies systems engineering to the limiting factors of food crop growth, particularly leafy greens, to discover ongoing solutions and methods that address increasing and variable electrical, urban space and labor costs.

Plants rely on a number of environmental factors to maintain healthy growth. Some examples include light, water, nutrients, carbon dioxide and without one of these factors a plant will die. By optimizing the relationships between these factors one can optimize plant metabolic rates and therefore increase growth rates. This is nearly impossible to do outdoors due to variable climate conditions and is therefore a key value proposition of agriculture itself.

In addition, applicant researched over two hundred individual indoor lighting, plumbing and plant containment products in order to find potential efficiencies to maximize the environmental factors. In doing so applicant realized that plant metabolism may be bottlenecked by one or more limiting factors. When the limiting factor is identified, system changes can be made to further increase metabolic rate potential.

Applicant has also since discovered multiple engineering techniques that can take advantage of this research process and make a farming unit adaptable to a rapidly evolving field. It is to these advantages that this device and related method are drawn.

The modular plant growth apparatus of this invention includes a housing having a top portion which is a flat panel, a bottom or bottom portion and two sides, each side having several hinges which can hingedly connect (other structures besides hinges can also be used to interconnect the flat panels together) to a corresponding side of another flat panel, the top portion having a front side with plant wells, the bottom portion being angled to act as a stability support portion. The bottom portion that provides stability in some embodiments can be a separate piece which also serves as a reservoir for the water. The bottom portion of the flat panel is similar to a rigid tab that interlocks with a receptacle; this allows stacking of multiple flat panels to produce a system of varying heights to meet conditions.

The apparatus also includes a moveable light source and at least one plant in each plant well. Some embodiments include leaving some plant wells empty depending on crop density needs. Several housings are hingedly connected to corresponding other housings so the various modular configurations can be formed so as to maximize plant growth.

In some embodiments, the housing has a series of tubes and connections which transport water via a closed tube system throughout the housing and to each plant well. Preferably, water is pumped to the top portion and allowed to disperse down the side of the housing with the plant wells.

It is highly preferred that the housings can be configured in large or small polygons or in large rows. Different configurations are better for growing different types of plants.

It is also preferable that bottom portion is a water reservoir connected to the series of tubes for watering of the plants in the plant wells. Some preferred embodiments include a wheel assembly connected to an underside of the bottom portion for easy movement and positioning of the apparatus.

The light source can be moved in an upward or downward direction relative to the housing and is located in the middle of a series of connected housings in preferred embodiments. In some preferred embodiments, the light source is located in front of the flat panel.

It is preferred that the plant wells can be cylindrical, oval or any other shape which optimizes plant growth. The plant wells are preferably removable from the flat panel for easy maintenance and cleaning.

In some preferred embodiments, the light source is more than one type of light source, the light sources are controlled by a micro-controller to transition or make more specific the ideal wavelengths of light reaching the plants.

Other preferred embodiments for smaller-scale plant growth preferably include a housing having a top portion which is a flat panel, a bottom portion and two sides, each side having several hinges which can hingedly connect to a corresponding side of another flat panel, the top portion having a front side with plant wells as well as a light source. Preferably, the housing in such embodiments is adaptable to use in a residential or commercial window so as to maximize plant growth.

BRIEF DESCRIPTION OF THE DRAWINGS

The drawings illustrate a preferred embodiment including the above-noted characteristics and features of the device. The device will be readily understood from the descriptions and drawings. In the drawings.

DETAILED DESCRIPTION

Figure 1:
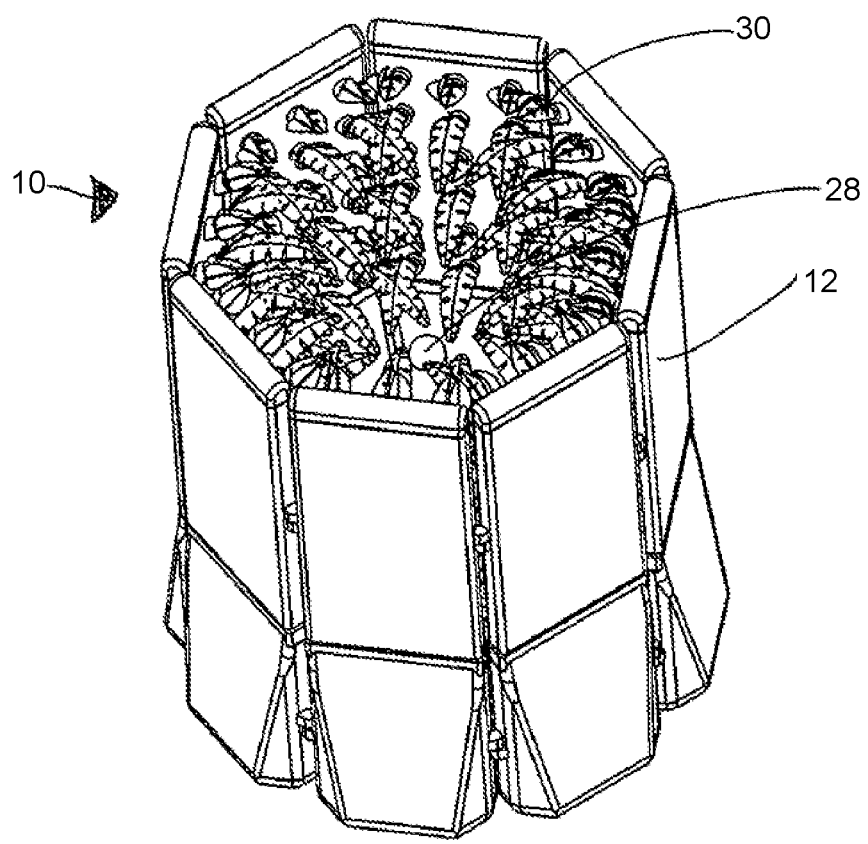
FIG. 1 is a perspective view of the plant growth apparatus with several housing connected together in a circular formation and with plants.
Figure 2:
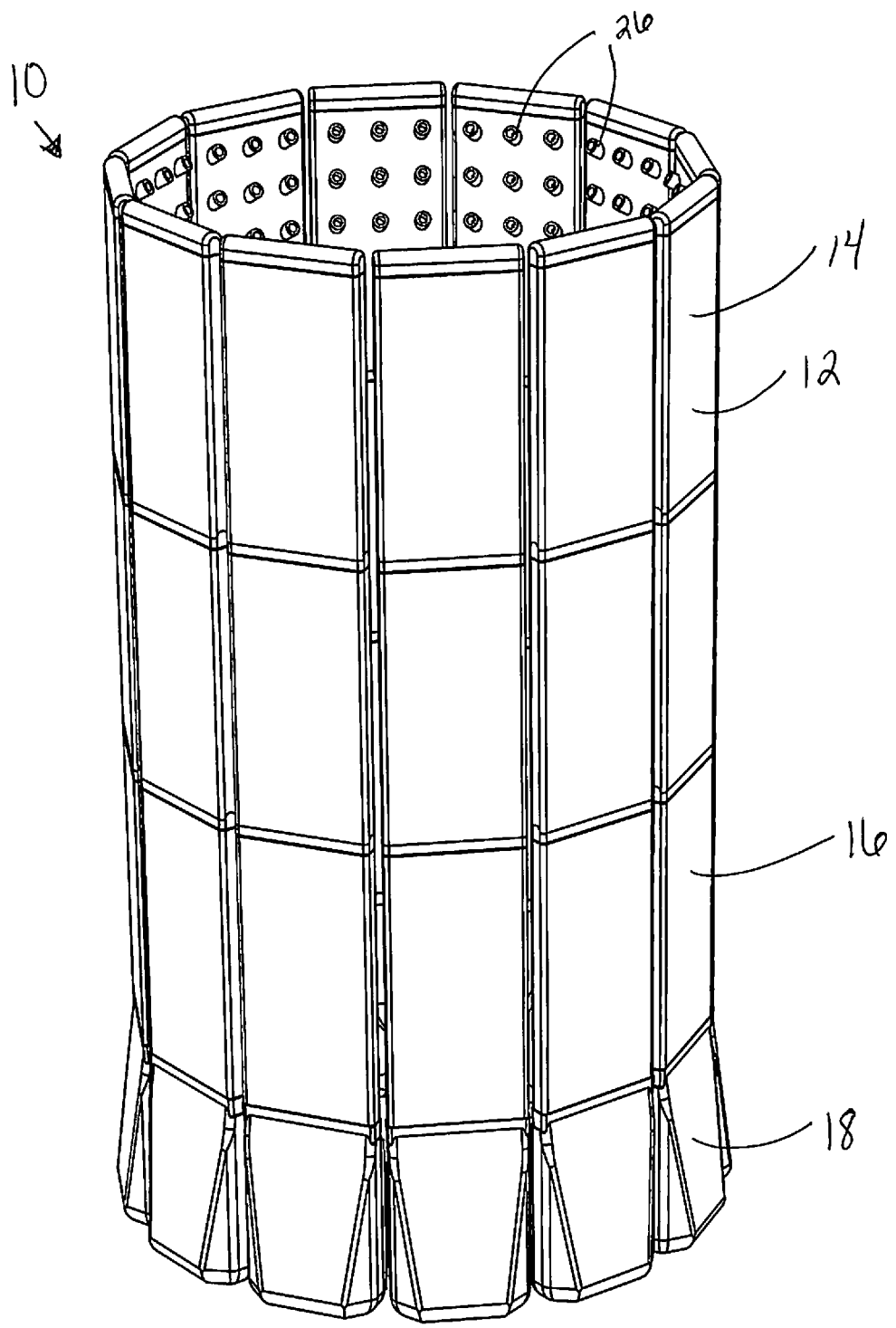
FIG. 2 is a similar perspective view of FIG. 1 without plants.

Referring to FIGS. 1-30, a plant growth apparatus in accordance with the present device and related method is generally designated by the reference numeral 10. As seen in FIGS. 1-30, plant growth apparatus 10 is modular and includes a housing 12 having a top portion 14 which is a flat panel 16, a bottom portion 18 and two sides 20. Each side 20 has several hinges 22 which can connect via such hinges 22 to a corresponding side 20 of another flat panel 16 as seen in FIGS. 1-6. Top portion 14 has a front side 24 with plant wells 26. Bottom portion 18 is angled to act as a stability support portion. Bottom portion 18 that provides stability in some embodiments can be a separate piece which also serves as a reservoir for water. Bottom section 38 of flat panel 16 is similar to a rigid tab that interlocks with a receptacle (such as with bottom portion 18); this allows stacking of multiple flat panels 16 to produce a system of varying heights to meet conditions.

Figure 3:
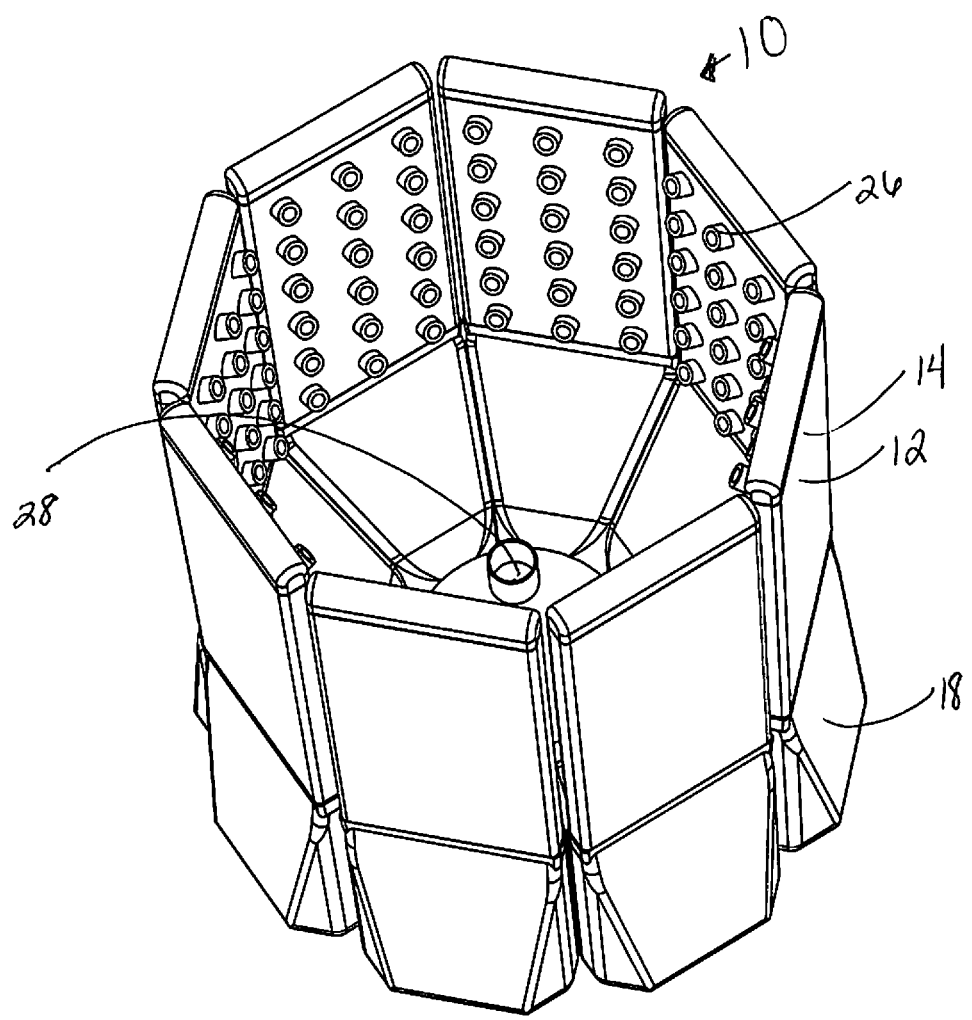
FIG. 3 is a top perspective view of FIG. 1.
Figure 4:
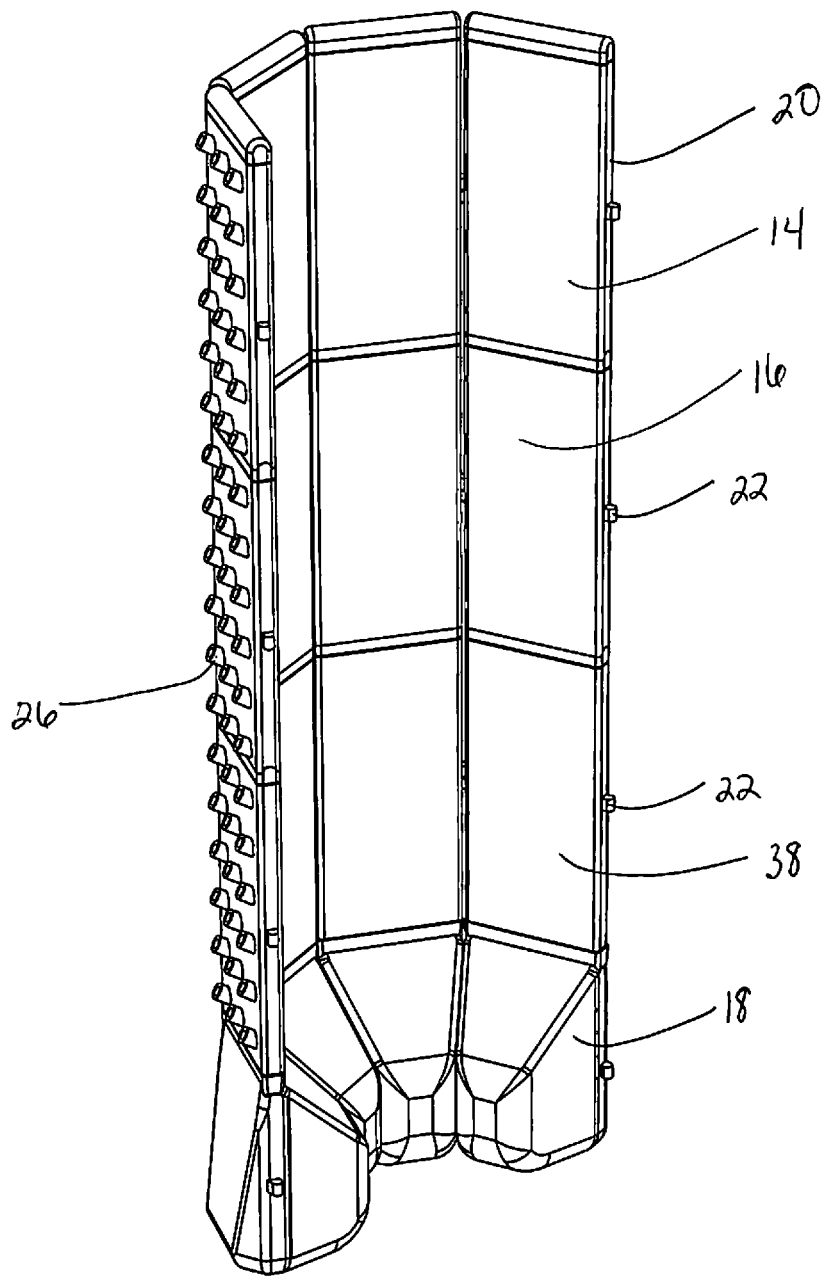
FIG. 4 is a perspective view of the plant growth apparatus with several housings connected together in a half-circle formation.
Figure 5:
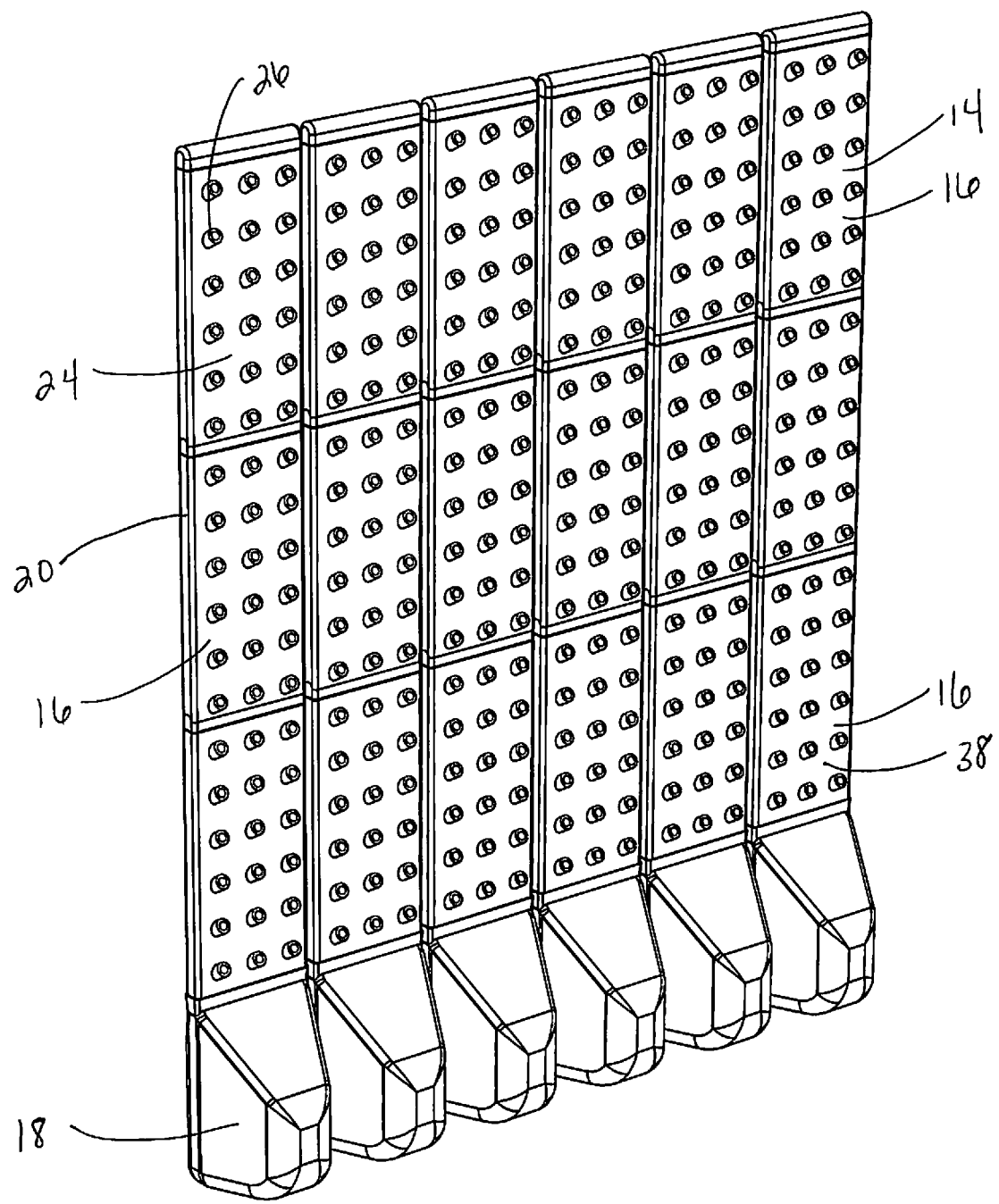
FIG. 5 is a perspective view of the plant growth apparatus with several housings connected together in a flat formation.
Figure 6:
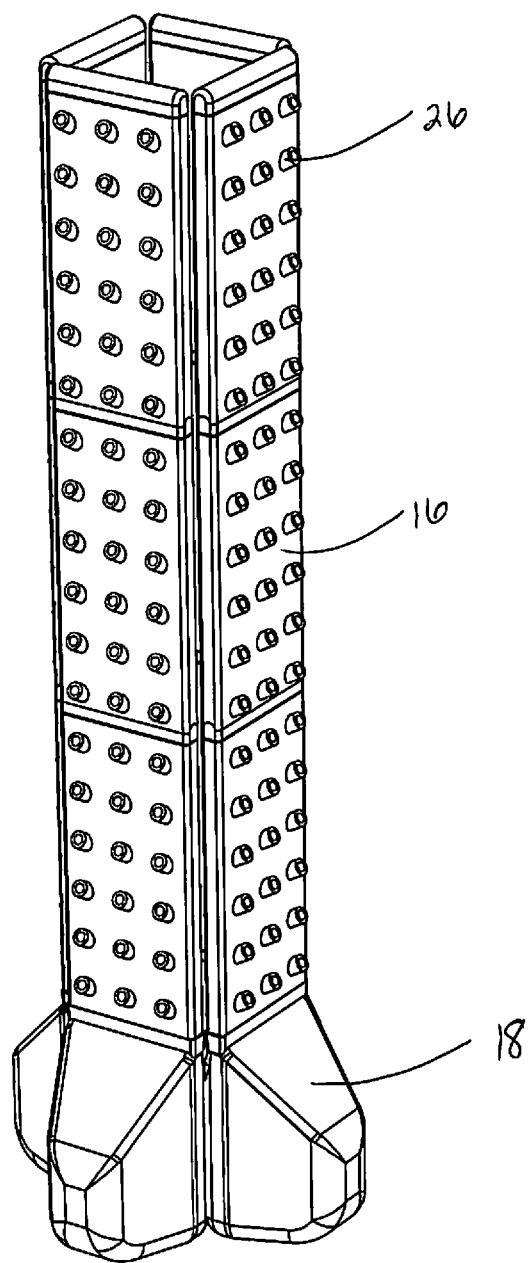
FIG. 6 is a front perspective view of the plant growth apparatus with several housings connected together in a square formation.

Apparatus 10 also includes a moveable light source 28 (shown in FIG. 3). At least one plant 30 (shown in FIG. 1) may be provided in each plant well 26 when the plant growth apparatus is used. Some embodiments include plant wells 26 being empty so as so improve and control plant density based on the type of crop being grown. Several housings 12 can be connected via hinges 22 (or other connection structures as this invention is not limited to just hinges) on sides 20 to corresponding other housings 12 so the various modular configurations can be formed. Housings 12 can be configured in large or small octagons or in large rows or in any other configuration which is conducive to plant growth. Different configurations are better for growing certain types of plants 30. Examples of some of the different housing 12 configurations can be seen in FIGS. 1-6

Housing 12 has a series of tubes 32 and connections 33 which transport water throughout housing 12 and to the plant wells 26. Details of this can be seen in FIGS. 9-11. Water is pumped to top portion 14 and allowed to disperse down front side 24 and into plant wells 26. In some embodiments, the water disperses down the inside of flat panels. In some embodiments, grow medium is packed directly into flat panels 16.

Figure 8:
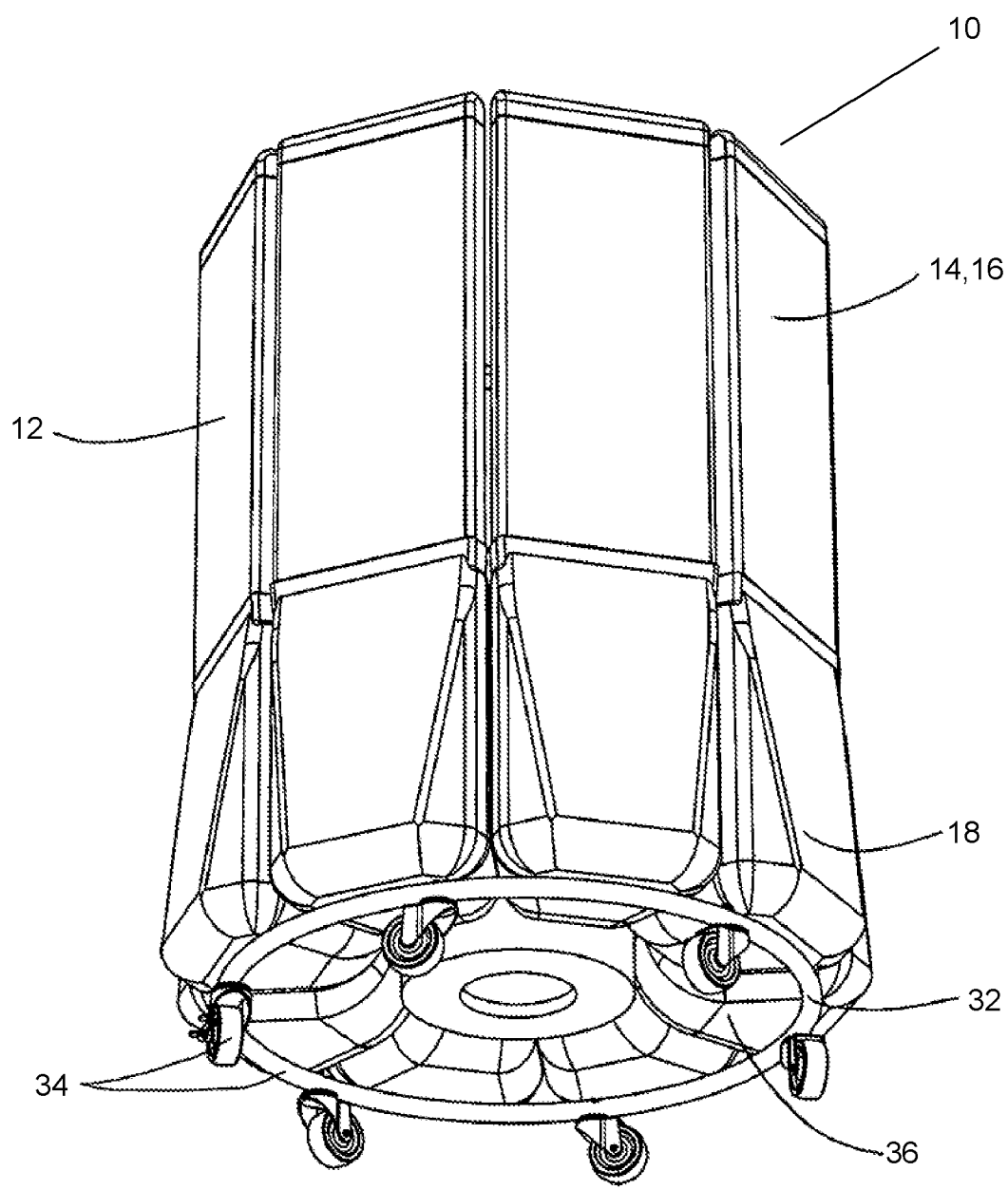
FIG. 8 is a bottom perspective view of the apparatus of FIG. 1 with wheel assembly.

FIG. 8 illustrates that bottom portion 18 may be shaped to provide stability to apparatus 10 and in some embodiments can also act as a water reservoir. As shown, the apparatus 10 includes a housing 12 having a top portion 14 of a flat panel 16, and a bottom portion 18. Bottom portion 18 is connected to the series of tubes 32 for watering of plants in plant wells. In some embodiments, bottom portion(s) 18 includes a wheel assembly 34 connected to an underside 36 of bottom portion 18 as also seen in FIG. 8. Wheel assembly 34 aids in easy movement of assembly 10.

Figure 29:
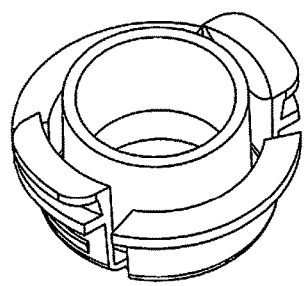
FIG. 29 is an enlarged view of a connector which joins the plant well and flat panel.
Figures 24, 25, 27:
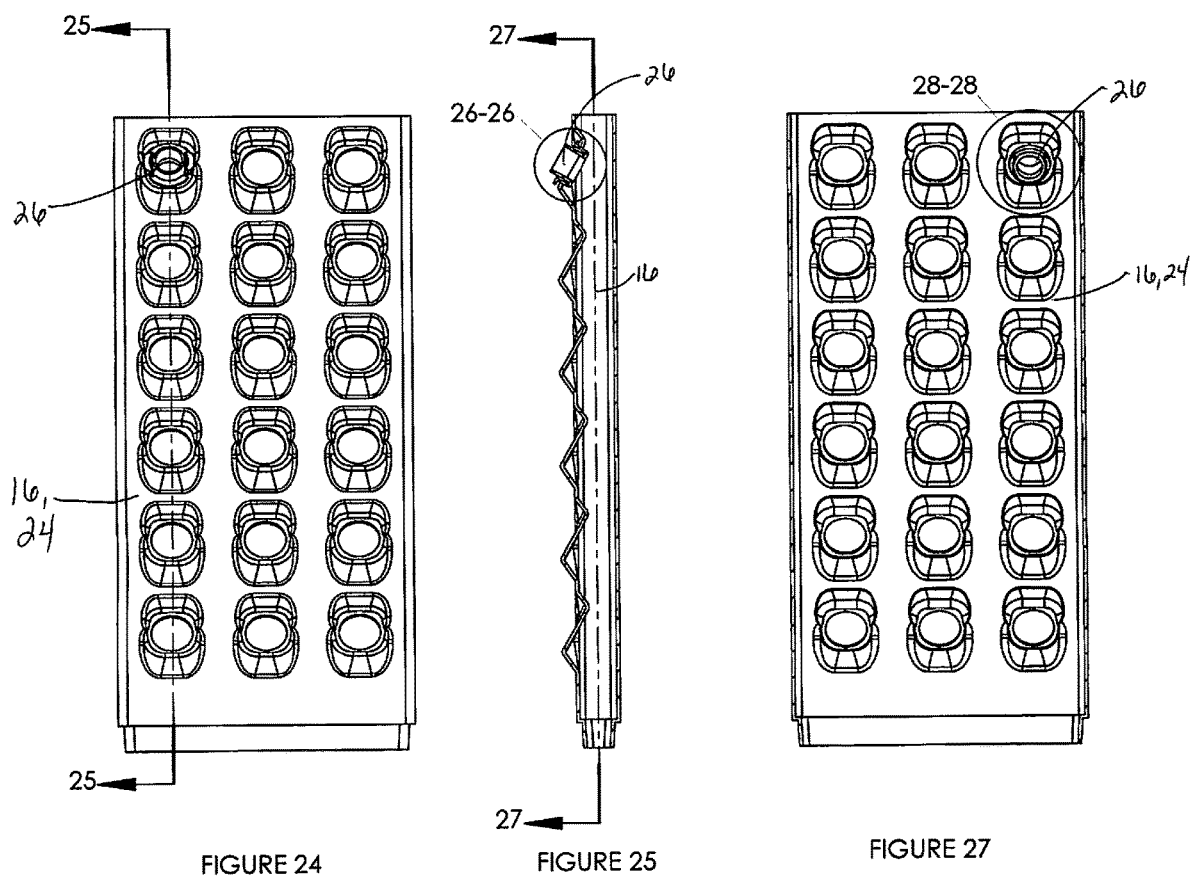
FIG. 24 is a front view of the top portion in another embodiment.
FIG. 25 is a cross-section of the apparatus of FIG. 24.
FIG. 27 is a front view of the top portion in another embodiment.

Light source 28 (shown in FIG. 1) can be moved in an upward or downward direction relative to housing 12 and is located in many different locations sometimes it is located in the middle of a series of connected housings 12. More on the various available light sources is discussed below. In some embodiments, light source 28 is located in front of flat panel 16 which has plant wells 26. Plant wells 26 can be cylindrical, oval or any other shape which optimizes plant growth as can be seen in FIGS. 12-28 which illustrate the many different shapes of plant wells 26. Plant wells 26 are removable from flat panel 16 via a connector device for easy maintenance and cleaning as seen in FIGS. 17, 20, 21a, 24 and 27. FIG. 29 illustrates the connector device which connects plant well 26 and flat panel 16.

Figure 7:
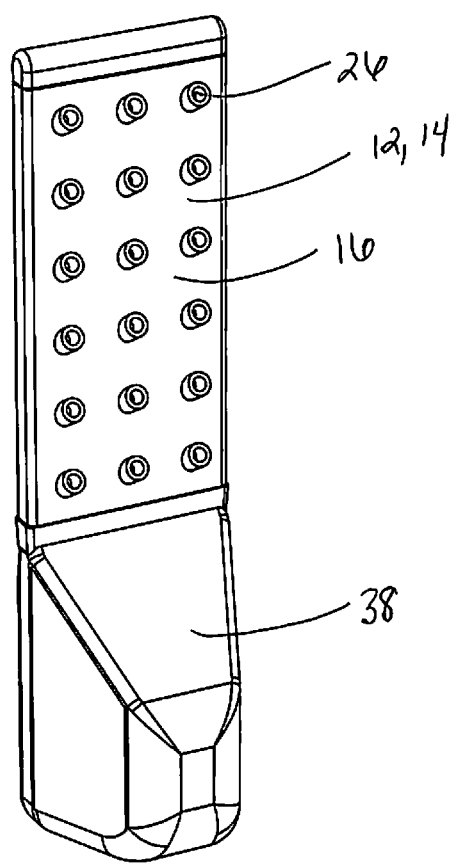
FIG. 7 is a front perspective view of the plant growth apparatus which can be used in a window.

Modular plant growth apparatus 10 can be large in size and can comprise many housings 12 connected together for large-scale plant growth operations. Alternatively, in another embodiment, plant growth apparatus 10 can be smaller in size for in-home use in locations such as a window as seen in FIG. 7. FIG. 7 illustrates that plant growth apparatus 10 for use in this type of environment, includes housing 12 having a top portion 14 which is a flat panel 16, the top portion 14 having plant wells 26. Housing 12 is adaptable to use in a residential or small-scale commercial window so as to maximize plant growth.

Part of applicant's apparatus also relates to a method for optimal crop rotation. Applicant's apparatus is a system built to accommodate a multi-stage process for a wide variety of plants all within one apparatus. The system accommodates plants at the baby and full-size stages to adapt with changing food market conditions. Generally plants increase in growth rate as their root system becomes more established and there is more available energy production via expanded leaf development. There are certain crops, however, that under certain market conditions will make more fiscal sense to harvest early. To accomplish this at least nine plant spaces should be available per square foot. This will accommodate dense planting of baby crops or the ability to further thin plants in order to grow to full size.

When done correctly, plants will be rotated through the system via an algorithm that ensures plants do not crowd each other, creating unhealthy growth, or are spread too far apart, which wastes energy and increases production costs. To generate a custom algorithm, the seed to harvest cycle time of that crop and number of harvests desired per month must be determined. A user can then take that information and insert it into a formula such as the example below.

One such example is the following:

Example: Lettuce requires 28 days for medium sized heads and we need one harvest per week. In the example below 'x' is 2 meaning that at any given point there are two crop rotations taking place in the same unit, allowing for a crop to be harvested every week.

Seed to harvest time (28 days)/number of crop stages (2: germination and final)=days per stage (14)

Days per stage (14)/number of rotations per unit (x)=number of harvests per week (1)

Another part of applicant's invention relates to optimal plant attachment. The size of the mechanisms in the unit that hold the plants are made to snugly fit the grow medium (grow medium is the usually inert material that seeds are planted in). This excludes the need for "net pots" that each plant sits in that needs to be removed and cleaned, which saves time and cost. It also simplifies production, which makes it more valuable for lay-users of the apparatus.

An example of this is as follows: 1" rockwool requires ¾" PVC pipe. At that size, the pipe will snugly hold the medium in place without the need for any additional moving parts. PVC pipe is not the only mechanism for accomplishing this as many different materials can be used for the pipe and related connections.

The distance between the plant and the grow light is very specific. The distance is based on the Daily Light Integer ("DLI"), which is the total photosynthetic photon flux or photosynthetically active radiation that is available to the plant in one day. The distance between the light and the plant is specifically designed to be sure the ideal DLI for the plant is achieved within a specific time frame at the lowest electrical expense possible.

To modify this, the ballast wattage is either raised or lowered, or alternatively, the number of base parts per unit can be increased or decreased so as to increase or decrease the radius between panels 16 and light source 28. An example of this would be going from an eight-base unit to a twelve-base unit. (See, for example, FIG. 1 versus FIG. 2 in terms of number of vertical flat panels 16 around light 28.)

By the end of the plant growth cycle, the maximum DLI for the plant should be achieved but not exceeded. When starting plants in the apparatus the minimum DLI can be used, but plants should not receive lower than the minimum DLI at any point during growth. Care should be taken to vary the DLI range during the growth period as little as possible to ensure the plant has close to the ideal DLI for as much of the growth period as possible. This will lead to increased growth rates.

An example of the above is as follows: ideal DLI (based on current research by applicant) is 17 for lettuce without additional carbon dioxide added to the environment. The lowest desired DLI for healthy growth is 12. The apparatus is designed to provide 17 DLI in twelve hours (to accommodate for the energy company time of use program). This requires the plants to grow around a 150 W MH bulb located 13-18" away from the light. This set up creates a DLI of 12 for early growth stages, increasing to 17 as the plant grows. Therefore, once the plant is fully grown the maximum DLI is not exceeded.

Figure 9:
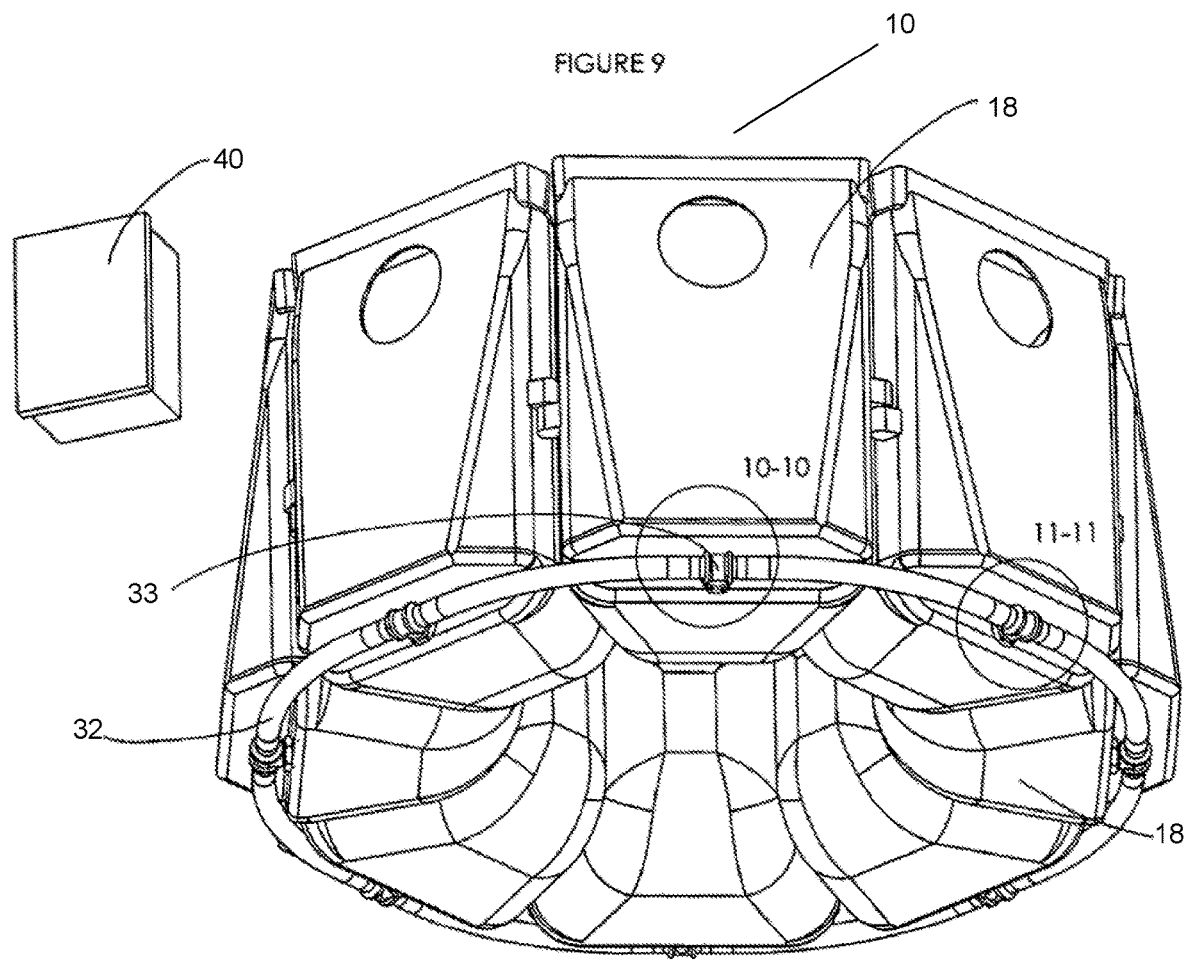
FIG. 9 is a bottom perspective view of the bottom portion with wheel assembly.
Figure 10:
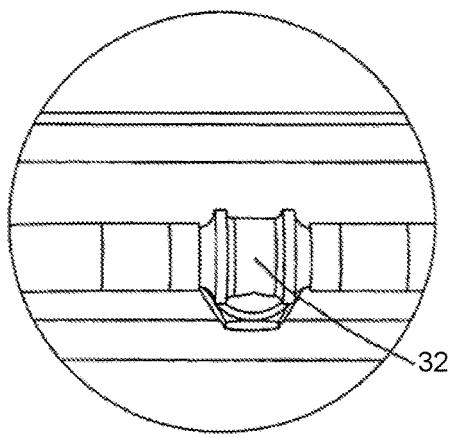
FIG. 10 is an enlarged fragmentary view of a water connection of FIG. 9 taken along line 10-10.
Figure 11:
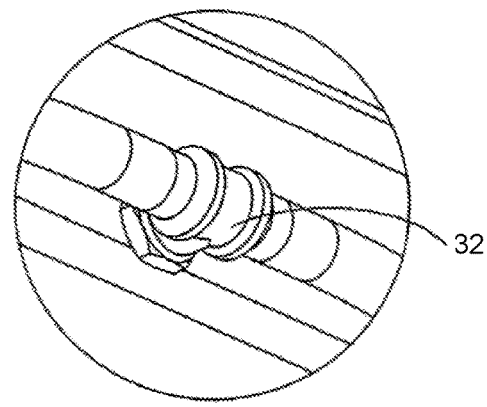
FIG. 11 is an enlarged fragmentary view of another water connection of FIG. 9 taken along line 11-11.
Figure 13:
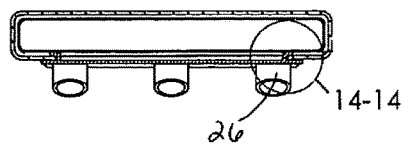
FIG. 13 is a cross section of the apparatus of FIG. 12 taken along line 13-13.
Figure 14:
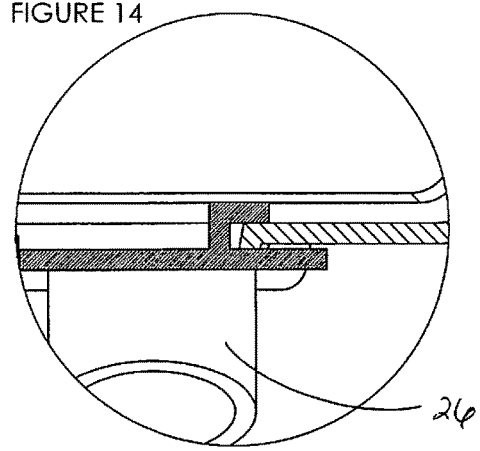
FIG. 14 is an enlarged fragmentary view of a plant well of FIG. 13 taken along line 14-14.
Figure 12:
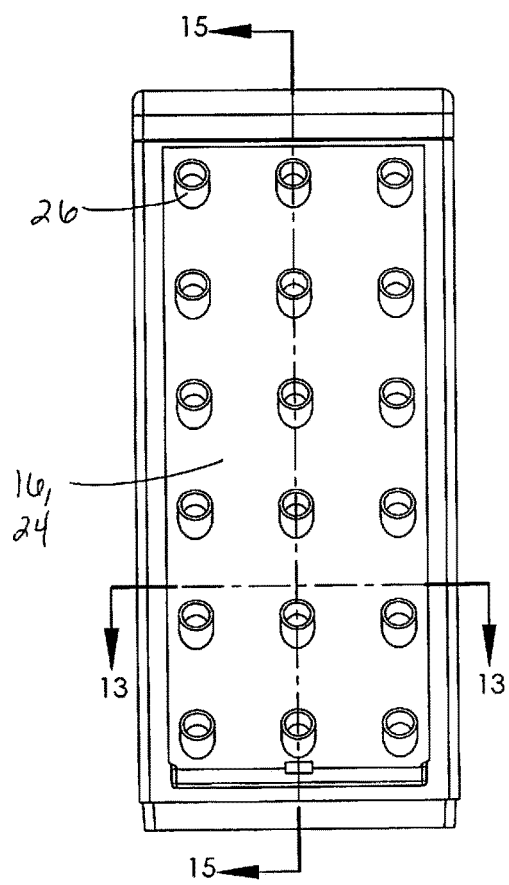
FIG. 12 is a front view of the top portion of FIG. 1.
Figure 15:
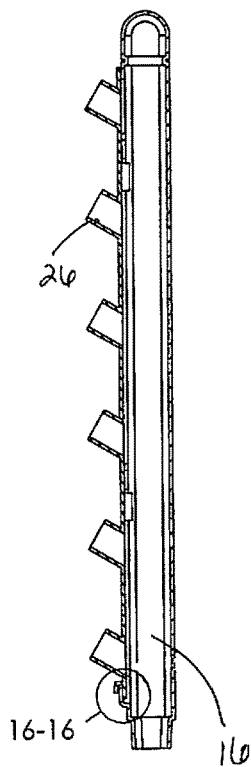
FIG. 15 is a cross-section of the apparatus of FIG. 12.
Figure 16:
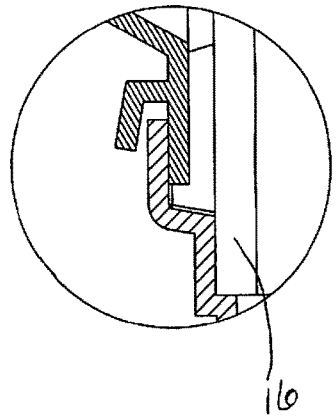
FIG. 16 is an enlarged fragmentary view of a plant well and flat panel of FIG. 15 taken along line 16-16.
Figure 19:
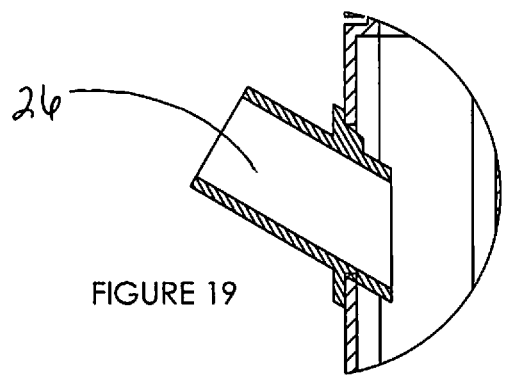
FIG. 19 is an enlarged fragmentary view of the plant well of FIG. 18 taken along line 19-19.
Figure 17:
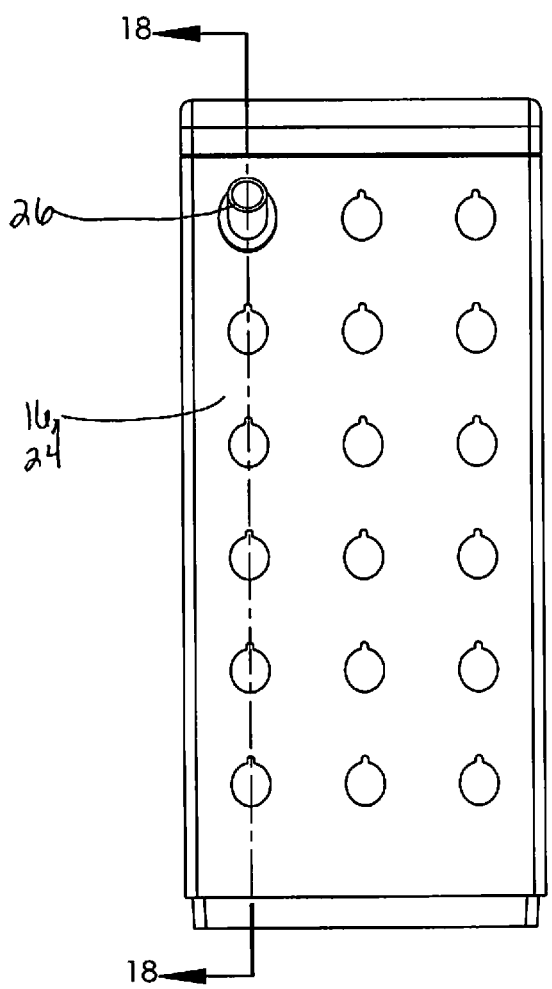
FIG. 17 is a front view of the top portion in another embodiment with some of the plant wells removed.
Figure 18:
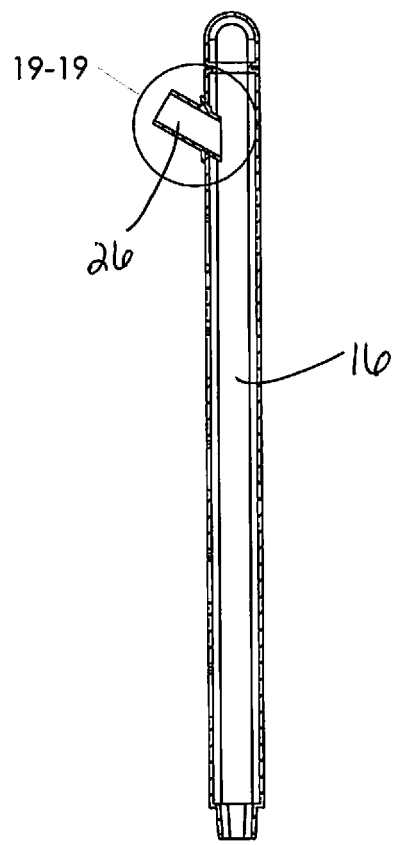
FIG. 18 is a cross-section of the apparatus of FIG. 17 taken along line 18-18.
Figure 21:
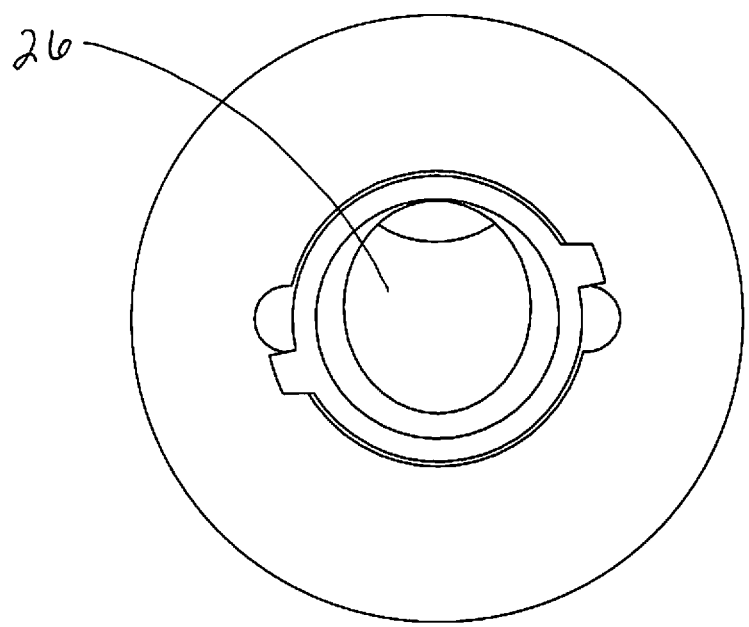
FIG. 21 is an enlarged fragmentary view of the plant well of FIG. 20 taken along line 21-21.
Figure 20:
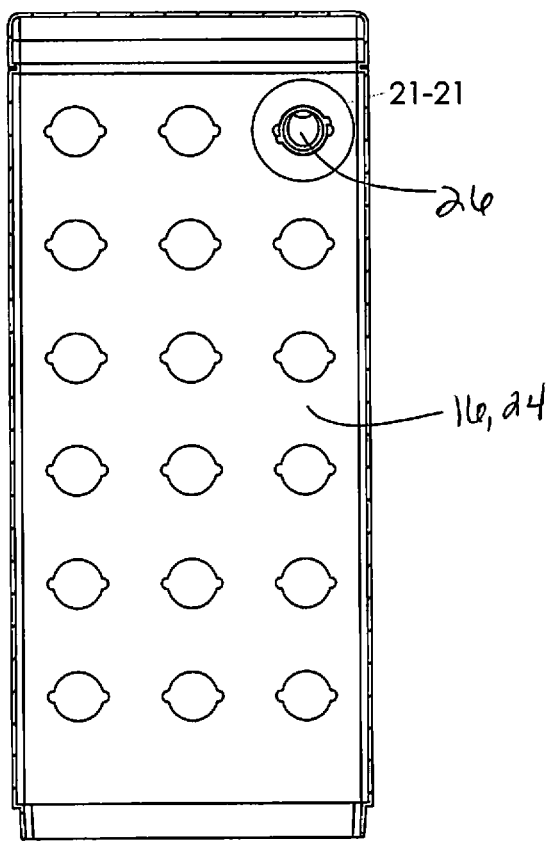
FIG. 20 is a front view of the top portion in another embodiment with some of the plant wells removed.
Figure 23:
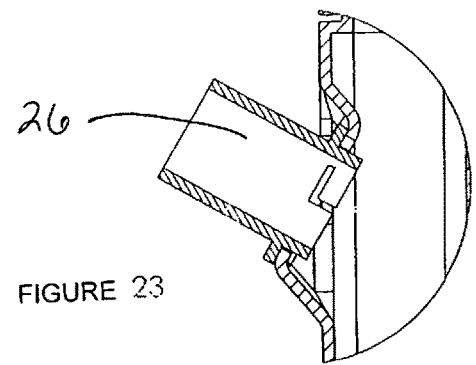
FIG. 23 is an enlarged fragmentary view of a plant well and flat panel of FIG. 22 taken along line 23-23.
Figure 21A:
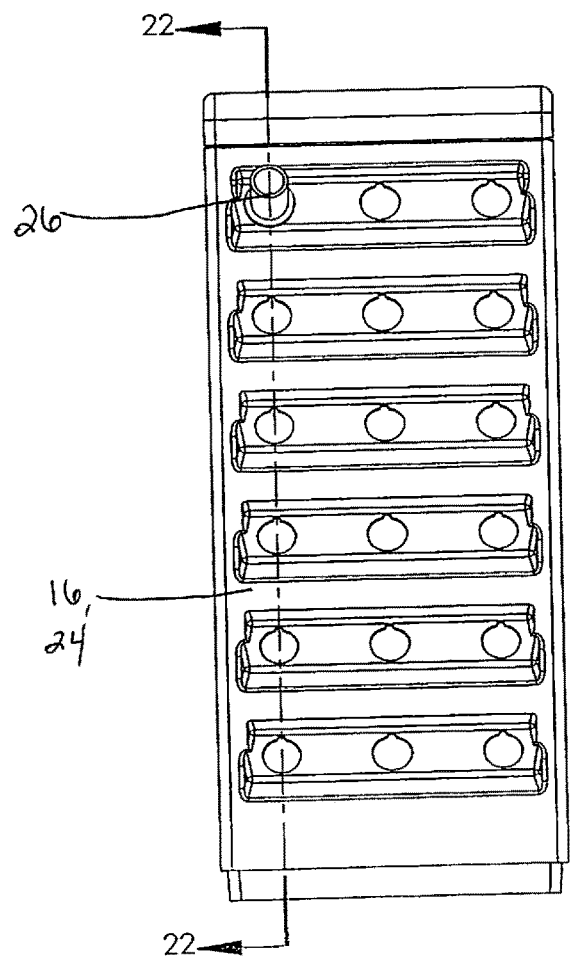
FIG. 21a is a front view of the top portion in another embodiment.
Figure 22:
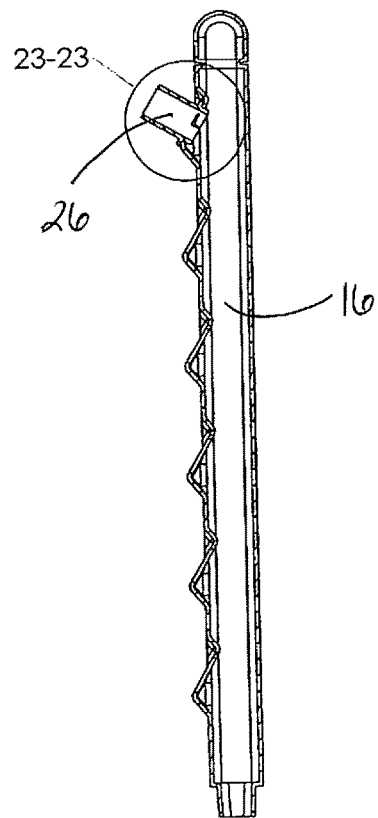
FIG. 22 is a cross-section of the apparatus of FIG. 22.
Figure 26:
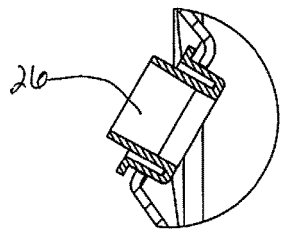
FIG. 26 is an enlarged fragmentary view of a plant well and flat panel of FIG. 25 taken along line 26-26.
Figure 28:
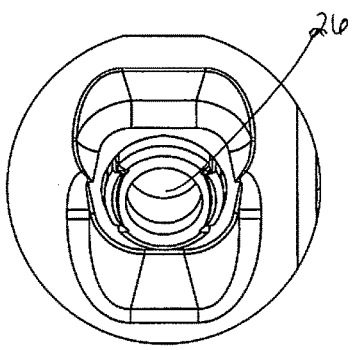
FIG. 28 is an enlarged fragmentary view of a plant well of FIG. 27 taken along line 28-28.

The water delivery system (referenced as tubes 32 and connections 34 above and in the drawings, specifically FIGS. 9-11) in the apparatus 10 comprises the following. The pump (not shown) operates on a low pressure system. Applicant's pump system significantly reduces energy consumption. To accomplish this, water created by the pump is directed onto the grow medium and is then passed to the plants directly below it via gravity. The surface tension of the roots and grow medium insure that water is effectively passed to the plants below them in a straight vertical line.

The design of the root containment area affects growth. Applicant has found that keeping roots in a semi-sealed environment (such as, for example, PVC pipes) is most effective for growth rates. Gouges can be made in the PVC pipe which the surface tension of the water will follow as it flows. As such, the roots will also follow the same gouges or channels allowing more space to be utilized within the root chamber and will allow for more effective nutrient uptake. The appearance of the roots from this design appears typically as a vortex.

Each water atomizer emits less than 1 gallon of water per minute (0.4 current). The water is dispersed in a way so that it covers the surface area of the interior of the root chamber. This assures that the water covers the contours of the unit and roots in a way that will not lead to root dessication.

Applicant's apparatus 10 has a modular design which is ideal for crop rotation. Flat panels 16 (part of housing 12) or plant wells 26 (holders) can be added to accommodate varied or more plants as seen in FIGS. 1-7. Adding more plant holders/panels to the unit increases the distance from the light to the plant canopy. Panels 16 or plant wells 26 can also be stacked to add more plant sites vertically. All the flat panels 16 are identical, allowing for manufacturing economies of scale.

An alternative embodiment to applicant's apparatus 10 includes a housing 12 which is comprised of cylindrical pipes (not shown) instead of flat panels 16. Plant wells 26 protrude off of cylindrical pipes. Cylindrical pipes form an octagon shaped bottom support section and corresponding top support section with vertical cylindrical pipes connecting the bottom and top support sections as well as plant wells 26 on cylindrical pipes in between.

Applicant's apparatus 10 is also energy efficient. This is accomplished in part since all materials on the interior of the unit are white which creates more reflectivity, and therefore, more light capture. The apparatus also preferably uses a high intensity discharge (HID) bulb. Utilizing the 360° radius of the HID bulb mixed with the reflective materials in the system captures more photosynthetically active light than applicant tested LED systems. Metal Halide (also referred to as "MH" herein) lights yield healthier vegetative growth, but High Pressure Sodium must be used as well when growing flowering plants. There is also an embodiment in which the system contains both types of light (MH and High Pressure Sodium) which are controlled by a micro-controller 40 (see FIG. 9) to transition or make more specific the ideal wavelengths of light reaching the plants.

To achieve the greatest energy efficiency, the lowest wattage bulbs are used. Instead of using one large light in the system, many smaller wattage bulbs are used. This keeps temperatures low, allows for more even, consistent growth and significantly reduces the amount of watts per pound utilized. However, enough distance must be kept between the bulb and the plant to allow room for the plant to grow without growing into the bulb and burning the plant. Therefore the maximum length of the plant is used in conjunction with the required DLI of the plant to find the appropriate wattage. For example, lettuce plants require 17 DLI and in a 3' wide cylindrical unit that utilizes the 360 degree radius of the bulb that would put the plant 13" away from the bulb. This will create a usable DLI of 12-17 (all within an acceptable range) over the course of its growth when using a 150 W bulb and ballast.

The apparatus is designed after effective ranges. For example, sometimes the ideal temperature is slightly sacrificed to improve upon the ideal DLI of the plant, which leads to increased growth rates.

Figure 30:
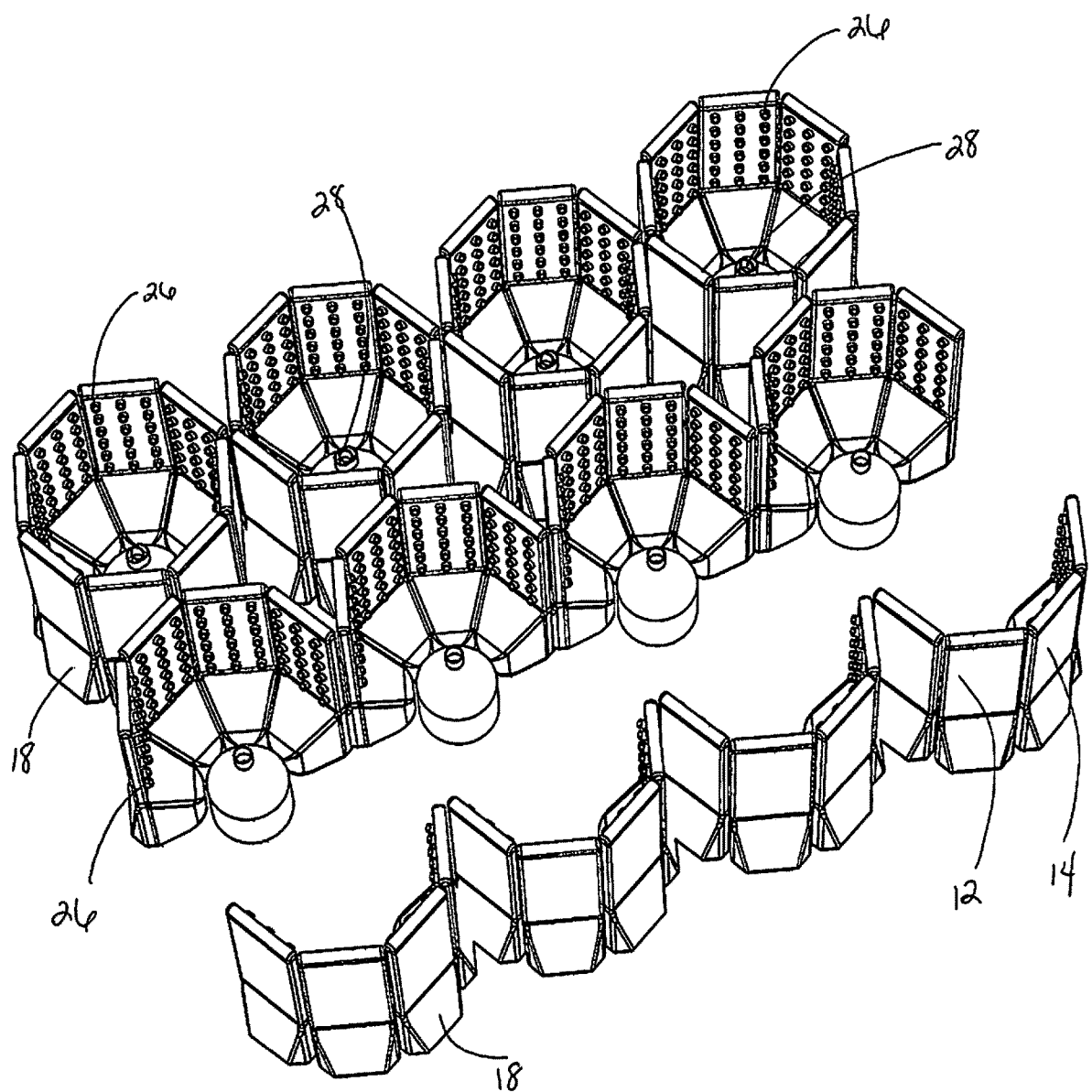
FIG. 30 is a perspective view of several plant growth apparatuses of FIG. 1.

Some embodiments include a vertical commercial farm wherein an array of modular, stacked units are held up by rails. Similar to compact shelving, access to plants is created when rows are separated. A small number of access openings can be created at once, which allows for increased square footage utility as seen in FIG. 30.

Smaller or larger units that utilize other light sources (such as CFL) still function in the same way. Water is pumped up to the top portion 14 of the unit and then it disperses down and plants 30 receive light from a light source 28 in the center of the apparatus 10. Plants can also be grown on the horizontal plane below the light in addition to plants growing around the bulb. Oxygen is added to the root chamber. Some farms of the prior art add carbon dioxide to the air around the leaves. Adding oxygen is an improvement over the prior art and increases plant growth rates.

The closed nature of the inside of apparatus 10 allows for adequate air exchange while containing any carbon dioxide added to the interior of the system to increase growth. In some embodiments, carbon dioxide is further captured when an HVAC unit and top cap (not shown) to the entire unit is used to more specifically control the interior air quality and environment.

Apparatus 10 is designed to take advantage of gravity and space efficiencies by growing around the light vertically, as opposed to systems that are grown horizontally as seen in the prior art. The use of gravity is essential for the most effective space utilization and energy usage in water delivery.

Apparatus 10 can utilize a wide range of nutrient types, which are added to the water supply. The irrigation system accommodates conventional commercial hydroponic nutrients, organic nutrients, compost teas and effluent from aquaculture systems. Because the tubes/connections 32 of apparatus 10 are an entirely closed system, evaporation rates are significantly reduced. As determined by testing, the evaporation rate dips below 3% against the recapture rate if a completely closed system is used. This is accomplished in the design by making sure as few air exchange opportunities are available as possible. This makes apparatus 10 much more effective in areas with short growing seasons and where lack of access to fresh water would make conventional farming techniques cost prohibitive.

Because of its low energy usage, some embodiments of apparatus 10 can be operated on small alternative energy systems. Such an apparatus 10 is effective particularly for home use, or in areas without significant access to traditional energy sources, solar panels, wind turbines and other "green" energy solutions can be integrated.

A combination of the economic and environmental efficiencies of apparatus 10 is an improvement over the prior art. Applicant's inventive apparatus 10 increases energy efficiencies by up to 28% compared to the tested LED lights. Apparatus 10 also increases water efficiency so less than 3% is lost to plant consumption or evaporation, increases yield per square foot to over 60 lbs. of every 4 ft. of vertical space (120 lbs. for an 8 ft. tall unit).

Light source 28 inside or next to apparatus 10 can be set to move up and down relative to housing 12. This further increases growth consistency of plants 30 across apparatus 10. Light source 28 can also be moved from side to side to accommodate an apparatus 10 which holds plants 30 of varying sizes. Light 28 can also move side to side to allow easy access to plant wells 26.

A wide variety of materials are available for the various parts discussed and illustrated herein. While the principles of this device and related method have been described in connection with specific embodiments, it should be understood clearly that these descriptions are made only by way of example and are not intended to limit the scope of the application.

The invention claimed is:

1. A plant growth apparatus comprising:
a plurality of base structures each having a reservoir for water;
a plurality of plant modules modules each having a front side with a removable plant panel,
a back side,
opposed side walls connecting the front and back sides and forming a passage between the front side and the back side for water flow,
the plurality of plant modules each having a lower portion configured to removably interlock with one of the plurality of base structures and the plurality of plant modules cooperatively forming a perimeter wall of the plant growth apparatus separating an interior space from an exterior space and front sides of the plurality of plant modules panels including a plurality of plant wells opened to the passage and forming an inner surface of the perimeter wall and the back sides of the plurality of plant modules forming an outer surface of the perimeter wall spaced outwardly from the inner surface of the perimeter wall and the interior space.

2. The plant growth apparatus of claim 1 including eight plant modules forming a generally octagon shaped plant growth apparatus having an octagon shaped perimeter wall separating the interior space from the exterior space.

3. The plant growth apparatus of claim 1 and further comprising a lighting source in the interior space and the lighting source is movable in an upward and downward direction.

4. The plant growth apparatus of claim 1 wherein at least one of the plurality of plant modules or the plurality of base structures are connected through hinge features along the opposed side walls of the plurality of plant modules.

5. The combination of claim 4 wherein the hinge features are disposed on the opposed side walls of the plurality of plant modules.

6. The plant growth apparatus of claim 1 including a plurality of wheels coupled to the plurality of base structures to movably support the plurality of plant modules.

7. The plant growth apparatus of claim 1 wherein the plurality of plant wells are removably connectable to the front side of the plurality of plant panels.

8. The plant growth apparatus of claim 1, wherein the perimeter wall is a polygon shape.

9. The plant growth apparatus of claim 1, further comprising a light source in the interior space.

10. The plant growth apparatus of claim 1 wherein the plurality of base structures are hingedly connected through one or more hinge features.

11. The plant growth apparatus of claim 1 wherein the plurality of plant panels are white to provide a reflective surface in the passage.

12. The plant growth apparatus of claim 1, wherein each plant module is rectangular shaped forming a rectangular shaped passage.

13. The plant growth apparatus of claim 1, including hinge features along the opposed side walls of each panel module to connect the plant module to an adjacent plant module.

14. The plant growth apparatus of claim 13, wherein the hinge features are disposed on the opposed side walls of the plurality of plant modules.

15. The plant growth apparatus of claim 1, wherein each base structure has an angled profile that is narrower at the top than at the bottom.

16. The plant growth apparatus of claim 1, further including an irrigation tube coupled to one or more of the plurality of base structures to provide water to the passages of the plurality of plant modules.

* * * * *